2,940,893

CONTROLLED PRECIPITATION OF RUBBER ONTO ASBESTOS FIBERS

David A. Feigley, Jr., and Leonard N. Ray, Jr., Manor Township, Lancaster County, Pa., assignors to Armstrong Cork Company, Lancaster, Pa., a corporation of Pennsylvania No Drawing. Filed Dec. 23, 1957, Ser. No. 704,324

14 Claims. (Cl. 162—155)

This invention relates generally to water-laid asbestos sheets and more particularly to water-laid asbestos sheets wherein the individual fibers are evenly coated with a deposit of a synthetic rubber. Still more particularly the invention relates to the controlling of the precipitation of synthetic rubber onto asbestos fibers by utilization of two different kinds of asbestos fibers.

Rubber-bonded asbestos fiber sheet material has been described in the past. The preparation of such material entails controlling the precipitation of rubber in a rubber latex in order that the rubber may smoothly and evenly deposit on the individual asbestos fibers in an asbestos slurry. Such control cannot be achieved by the normal beater saturation procedures used in the deposition of rubber on cellulosic fibers. The addition of a synthetic rubber latex to an asbestos fiber slurry normally brings about the prompt clumping of the rubber in the synthetic latex to form a lumpy mass completely unsuitable for sheet formation. It has therefore been necessary to develop special procedures to smoothly and evenly deposit a synthetic rubber onto asbestos fibers in a slurry. One such procedure is described in U.S. Patent 2,759,813— Feigley, issued August 21, 1956. Other procedures are available, each of which uses some special pretreating step in order to achieve control of the deposition of the rubber on the fibers.

The present invention contemplates control of the rubber precipitation onto asbestos fibers by control of the characteristics of the asbestos fibers themselves and not by the addition of a pretreating agent. The invention contemplates forming an aqueous slurry of asbestos fibers. The total asbestos fibers to be used, however, are a mixture of 10–90% by weight chrysotile asbestos fibers and 90–10% by weight crocidolite asbestos fibers based on the total dry weight of asbestos to be used. The slurry is refined. To the resulting slurry there is added a synthetic rubber latex. During subsequent agitation the rubber content of the synthetic rubber latex is evenly deposited on all the asbestos fibers. The resulting slurry of coated fibers is then formed into a sheet on conventional papermaking equipment such as a Fourdrinier wire or a cylinder machine.

The invention herein results from the observation that chrysotile asbestos fibers carry a positive charge when suspended in neutral water while crocidolite (and its equivalent, amosite) fibers carry a negative charge when so suspended. A mixture of the two kinds of asbestos fibers bearing opposite charges renders it possible to add a synthetic rubber latex to the resulting slurry and accomplish smooth, even deposition of the rubber binder in that latex without further treatment at all. Thus for the first time the present invention contemplates the disclosure of the completely unexpected and unobvious teaching that rubber may be deposited on asbestos fibers without any chemical pretreating at all so long as the characteristics of the asbestos fibers themselves are controlled.

As inticated above the total amount of fibers used must contain 10–90% by weight chrysotile and 90–10% by weight crocidolite. If one or the other kinds of the two asbestos fibers is present in an amount outside the above-stated ranges, the latex to be added will behave as if only one kind of asbestos fibers is present. Each kind of asbestos fiber must be present in the slurry in an amount at least equal to about 10% by weight of the total fiber.

The precise relative amounts of the two fibers within the ranges given above can be varied depending on the drainage characteristics desired in the final slurry and on the nature of the latex to be used. Using a 50:50 mixture of chrysotile-crocidolite as a basis, the general rule is that slowly increasing the relative amount of chrysotile will bring about a slow increase in the Canadian 3-gram freeness, other factors being constant. Stated another way, this means that increasing the relative amount of chrysotile fibers, within the limits above stated, will produce a faster draining sheet. Conversely a relative increase in the amount of crocidolite fibers will produce a slower draining sheet. These rules hold true for use of the normally used anionic synthetic rubber latices. Should the relatively rare cationic synthetic rubber latices be used, the rule works in reverse. This situation allows precise control of the slurry characteristics of the coated fibers. Where a sheet of thin gauge is to be prepared, a slower draining slurry and hence a higher proportion of crocidolite fibers would be used. Where thicker sheets are desired with the attendant need for a faster draining slurry, a higher proportion of chrysotile fibers would be used. This situation will be illustrated in the examples given subsequently. An excellent all-around sheet contains 67% by weight chrysotile and 33% by weight crocidolite based on the total weight of the asbestos fibers.

The proper ratio of asbestos fibers is simply added to the water admixed therewith. The total amount of mixed asbestos fibers will generally be in the range of about 0.3–5% by weight of the total slurry. Once the mixture of asbestos fibers has been dispersed, the slurry is subjected to mechanical refinement as in a Jordan engine, beater, disc refiner, or the like. The degree of mechanical refinement will be controlled by the type of sheet desired in the final product. Five minutes of beating in a Valley beater with standard weights is usually the minimum, while 15 minutes of such beating is the maximum. Such refinement will shorten the asbestos fibers and insure that the bundles of fibers are further reduced to fibers having sufficiently small diameters. It will be appreciated that the order of addition of the two kinds of asbestos fibers to the water is not significant. The chrysotile or the crocidolite may be added to the water first, or alternatively, a mixture of the two kinds of fibers may be added.

Once the slurry has been refined to the desired extent, it is preferred that the slurry be brought to a consistency in the range of about 0.5–3%, with 1% the preferred consistency. Experience has shown that asbestos slurries of 1% consistency are easily handled in the processing equipment. The making of the asbestos slurry in water may be carried out in any convenient container, but it is preferred that a chest equipped with an agitator be used.

Once the slurry has been formed, refined, and diluted to the proper consistency, the next step is the mere addition of the synthetic rubber latex. As pointed out above, the process of the present invention eliminates the need of any special treating step of the asbestos fibers.

The usual synthetic rubber latices may be used in the present invention. Typical of these are the products known as GR-S which are copolymers of butadiene and styrene containing about 50% to about 70% butadiene. There may also be used copolymers of butadiene and acrylonitrile containing about 50% to about 80% butadiene; these latices may be purchased under the name "Hycar." Neoprene may also be used. Neoprene is a polymer of 2-chloro-butadiene-1,3, generally referred to as polychloroprene. If desired homopolymers of butadiene may be employed as well as homopolymers or copolymers of butadiene homologues, such as isoprene. These materials are generally designated as synthetic rubbers and more specifically designated as rubberlike polymers of butadiene, isoprene, and chloroprene, and rubberlike copolymers of butadiene or isoprene with copolymerizable vinyl compounds such as styrene and acrylonitrile. These synthetic rubbers are added to the slurry in the form of a latex. The latices normally contain about 25% to about 50% solids. The latices contain additional compounding ingredients such as stabilizers and the like which are well-known to the art and which form no part of the present invention.

The selected synthetic rubber latex is simply poured into the asbestos slurry. The slurry is gently agitated and the rubber content of the latex coagulates and evenly deposits upon the asbestos fibers. Precipitation and deposition are complete usually within about 15 minutes and more usually within six or seven minutes. The resulting slurry of coated fibers is then formed into a sheet on conventional papermaking equipment such as a Fourdrinier wire or a cylinder machine.

The amount of rubber to be deposited on the fibers will generally vary within the range of about 10–75% by weight rubber based on the dry weight of the fibers. The precise use of the final product will often determine the exact amount of rubber needed. A good all-around product suitable for use as gasketing and the backing for plastic floor coverings results when about 20% by weight synthetic rubber based on the dry weight of the fibers is used.

The following examples illustrate several embodiments of this invention. All parts are by weight unless otherwise stated.

Example I

In the formulations given below the asbestos fibers were taken up in the water and the slurry was refined for ten minutes in a Valley laboratory beater. The synthetic rubber latex was then added to the slurry with gentle agitation. The coated fibers were then formed into a sheet on a screen measuring 12" x 12". This sheet was dried in an air-circulating oven maintained at 195° F. Following are the formulations:

| Ingredients | Run 1 | Run 2 | Run 3 |
|---|---|---|---|
| Water........................parts.. | 3,750 | 3,750 | 3,750 |
| Chrysotile......................do.... | 18.75 | 25.0 | 33.75 |
| Crocidolite.....................do.... | 18.75 | 12.5 | 3.75 |
| Butadiene-Styrene Copolymer, 50% Styrene (40% solids).................parts.. | 18.8 | 18.8 | 18.8 |
| Canadian Freeness..............cc... | 160 | 680 | 720 |

In all the above examples precipitation was complete in about six minutes. The white water was clear showing that all the rubber had been precipitated. When the resulting sheets had been dried, excellent gasketing material resulted.

When the above procedure was attempted with 37.5 parts chrysotile asbestos, and no crocidolite, a lumpy precipitate resulted, completely unsuitable for the formation of the sheet. When the precipitation was repeated with 37.5 parts of crocidolite, and no chrysotile, a slimy gelatinous slurry was produced which was so slow draining as to be impossible to use for sheet formation under normal conditions.

Example II

Example I was repeated with the following formulations:

| Ingredients | Run 4 | Run 5 | Run 6 |
|---|---|---|---|
| Water........................parts.. | 3,750 | 3,750 | 3,750 |
| Chrysotile......................do.... | 28.1 | 33.75 | 30.0 |
| Crocidolite.....................do.... | 9.4 | 3.75 | 7.5 |
| Butadiene-Acrylonitrile Copolymer, 40% Acrylonitrile (40% solids).......parts.. | 18.75 | 19.1 | 19.1 |
| Canadian Freeness..............cc... | 380 | 600 | 460 |

Precipitation was accomplished in about six minutes. The white water was clear, and excellent gasket material resulted on drying.

Example III

Example I was repeated using the following formulation:

| Ingredients | Run 7 |
|---|---|
| Water........................parts.. | 3750 |
| Chrysotile......................do.... | 25 |
| Crocidolite.....................do.... | 12.5 |
| Polychloroprene (35% solids, Neoprene 735).. | 18.75 |
| Canadian freeness...............cc... | 680 |

We claim:

1. A method of making a felted asbestos sheet which comprises forming an aqueous slurry of asbestos fibers containing 10–90% by weight chrysotile asbestos fibers and 90–10% by weight crocidolite asbestos fibers based on the total weight of asbestos in said slurry, adding a synthetic rubber latex to the resulting slurry while agitating said slurry whereby the rubber content of said latex is evenly deposited on the asbestos fibers, and forming the resulting slurry of coated fibers into a sheet.

2. A method according to claim 1 wherein said synthetic rubber comprises a butadiene-styrene copolymer.

3. A method according to claim 1 wherein said synthetic rubber comprises a butadiene-acrylonitrile copolymer.

4. A method according to claim 1 wherein said synthetic rubber comprises a polychloroprene.

5. A method according to claim 1 wherein said synthetic rubber is deposited on the asbestos fibers in an amount of about 10–75% by weight of said rubber based on the dry weight of said fibers.

6. A method according to claim 1 wherein said chrysotile asbestos fibers are present in an amount of about 67% by weight and said crocidolite asbestos fibers are present in an amount of about 33% by weight based on the weight of total fibers present.

7. A method according to claim 6 wherein the synthetic rubber comprises a butadiene-styrene copolymer.

8. A water-laid sheet comprising about 10–90% by weight chrysotile asbestos fibers and about 90–10% by weight crocidolite asbestos fibers based on the total weight of asbestos in said sheet, all of said fibers having deposited thereon an even coating of a synthetic rubber.

9. A sheet according to claim 8 wherein said synthetic rubber comprises a butadiene-styrene copolymer.

10. A sheet according to claim 8 wherein said synthetic rubber comprises a butadiene-acrylonitrile copolymer.

11. A sheet according to claim 8 wherein said synthetic rubber comprises a polychloroprene.

12. A sheet according to claim 8 wherein said synthetic rubber is present in an amount of about 10–75% by weight based on the dry weight of said fibers.

13. A sheet according to claim 8 wherein said chrysotile asbestos fibers are present in an amount of about 67% by weight and said crocidolite asbestos fibers are present in an amount of about 33% by weight based on the total weight of asbestos.

14. A sheet according to claim 13 wherein the synthetic rubber is a butadiene-styrene copolymer.

References Cited in the file of this patent

UNITED STATES PATENTS

| | | |
|---|---|---|
| 1,956,053 | Tucker | Apr. 24, 1934 |
| 2,133,693 | Greider | Oct. 18, 1938 |
| 2,407,581 | Smith et al. | Sept. 10, 1946 |
| 2,601,597 | Daniel et al. | June 24, 1952 |
| 2,657,991 | Walsh | Nov. 3, 1953 |
| 2,661,287 | Barbaras | Dec. 1, 1953 |
| 2,661,288 | Barbaras | Dec. 1, 1953 |